United States Patent [19]

Klug et al.

[11] 4,168,600
[45] Sep. 25, 1979

[54] MOWER DISCHARGE CHUTE ASSEMBLY

[75] Inventors: Alan G. Klug, Oshkosh; William J. Schlapman, Winneconne, both of Wis.

[73] Assignee: J. I. Case Company, Racine, Wis.

[21] Appl. No.: 850,871

[22] Filed: Nov. 14, 1977

[51] Int. Cl.² ............................................. A01D 35/26
[52] U.S. Cl. ........................................ 56/202; 56/16.6
[58] Field of Search ........................ 56/202, 13.4, 16.6

[56] References Cited
U.S. PATENT DOCUMENTS

| 3,934,392 | 1/1976 | Moery et al. | 56/202 |
| 3,958,401 | 5/1976 | Carpenter | 56/202 |
| 3,987,606 | 10/1976 | Evans | 56/202 |

Primary Examiner—Russell R. Kinsey
Attorney, Agent, or Firm—Cullen, Sloman, Cantor, Grauer, Scott & Rutherford

[57] ABSTRACT

The disclosed chute assembly is particularly adapted to collect the discharge from a rotary lawn or garden tractor, particularly a mower having a vertically adjustable rotary blade housing. In the disclosed embodiment, the chute between the blade housing and the hopper has two telescopically adjustable sections, including a discharge chute which is pivotally supported on the hopper opening lip and a spiral receiving chute which is fixed to and communicates with the blade housing. The mower blade may thus be adjusted vertically without affecting the chute assembly and the chute sections may be easily removed for cleaning, storage or repair.

5 Claims, 3 Drawing Figures

MOWER DISCHARGE CHUTE ASSEMBLY

BACKGROUND OF THE INVENTION

1. Field of the Invention

The present invention relates to collection systems for lawn and garden tractors, including riding mowers and the like. More particularly, the present invention relates to a mower discharge chute assembly which receives the discharge from the mower and collects the discharge in a hopper or other enclosure.

2. Description of the Prior Art

Grass catchers or bagging attachments have long been available for mowers, including walk behind and riding power mowers. The present riding mowers include a hopper enclosure at the rear of the mower and a chute between the mower and the hopper. Plastic chuting is preferred because it is light in weight, strong and easily molded to the desired configuration. In the simplest form, the chute is simply a tubular plastic member which extends from the mower blade housing to the cover of the hopper as shown in U.S. Pat. No. 3,958,401. Single chute molded configurations have also been suggested by the prior art as shown in U.S. Pat. Nos. 3,961,467 and 3,974,631. The single section chute has, however, several disadvantages. The chute is often difficult to remove and the collection system often clogs with grass clippings, debris, etc. Further, the improved rotary mowers include a vertically adjustable blade housing to adjust the cut of the mower and single chute collection systems have not been satisfactory for adjustable mowers.

The more recent collection systems include three generally cylindrical telescopic chute sections and, in some embodiments, an extension on the blade housing. U.S. Pat. No. 3,934,392 discloses a three-piece discharge chute assembly wherein the center section is removable for cleaning. In order to clean the chute assembly, the operator must generally reach into the horn of the blade housing to pull out grass plugs and other debris, which is unsatisfactory from a safety consideration. Bolted or permanently secured chute sections have also been unsatisfactory because of the difficulty in removing the sections for cleaning, etc.

The mower discharge chute assembly of this invention solves many of the problems of the prior art by using two telescopically assembled chute sections which may be easily removed and which guide the discharge from the mower in a spiral path through the chute into the hopper. The upper section is pivotally supported in the hopper opening and the lower section is fixed to the blade housing, providing automatic adjustment of the chute assembly as the blade housing is adjusted vertically.

SUMMARY OF THE INVENTION

As described above, the mower discharge chute assembly of this invention is particularly suitable and adapted for rotary lawn mowers having a vertically adjustable blade housing and a collection hopper having an upper inlet opening for receiving the discharge of the mower. The chute assembly preferably includes two telescopically nested tubular sections. The upper discharge section has an upper end portion removably received within the hopper inlet opening, pivotally supported on the lip of the opening, and includes a downwardly angled inlet portion terminating in an enlarged bell opening. The lower receiving chute section has a lower end opening secured to and communicating with the discharge opening of the lawn mower blade housing and includes an upwardly angled portion telescopically received within the enlarged bell opening of the upper discharge chute section. The blade housing may thus be raised and lowered without disturbing the chute assembly. The lower receiving chute section is raised and lowered with the housing and the upper section tilts about the inlet hopper lip to maintain communication between the mower discharge opening and the hopper through the chute sections.

In the preferred embodiment of the discharge chute assembly, the lower receiving chute section guides the discharge from the blade housing upwardly in a spiral path substantial reducing clogging of the chute assembly. It has been found that the discharge from a rotary mower will follow a spiral path which causes clogging in a cylindrical chute, particularly a straight cylindrical chute. In the preferred embodiment of the discharge chute assembly of this invention, the lower receiving chute includes an enlarged rectangular opening spout, which is retained to the rotary blade housing and which communicates with the discharge opening of the blade housing. The discharge chute section is generally rectangular in transverse cross section and extends outwardly and upwardly from the opening spout in a generally spiral configuration of reducing rectangular cross section, defining a spiral path for the discharge of the rotary mower. In the disclosed embodiment, the upper discharge chute includes a rectangular bell opening which telescopically receives the upper end portion of the lower receiving chute. The chute assembly of this invention thus reduces clogging and may be easily disassembled for cleaning, storage, etc.

The discharge chute assembly of this invention also includes other advantages not found in the prior art. For example, the upper discharge chute section is self-supporting within the hopper cover when the lower receiving chute is removed. In the disclosed embodiment, the upper chute section includes a downwardly opening channel which is received over the hopper opening lip pivotally supporting the upper chute section. The upper end portion of the discharge chute section is generally rectangular and the hopper inlet opening is also rectangular, closely receiving the upper end of the chute section. When the lower section is removed, the upper section tilts forwardly, but is retained within the hopper cover. Further, in the disclosed embodiment, the hopper cover is pivotally retained by the hopper opening lip, permitting opening of the hopper cover to remove the collection of clippings, etc. without disturbing the upper discharge chute section.

Other advantages and meritorious features of the present mower discharge chute assembly will be apparent from the following description of the preferred embodiments, the appended claims and the drawings, a brief description of which follows.

DESCRIPTION OF THE PREFERRED EMBODIMENTS

Figure 1:
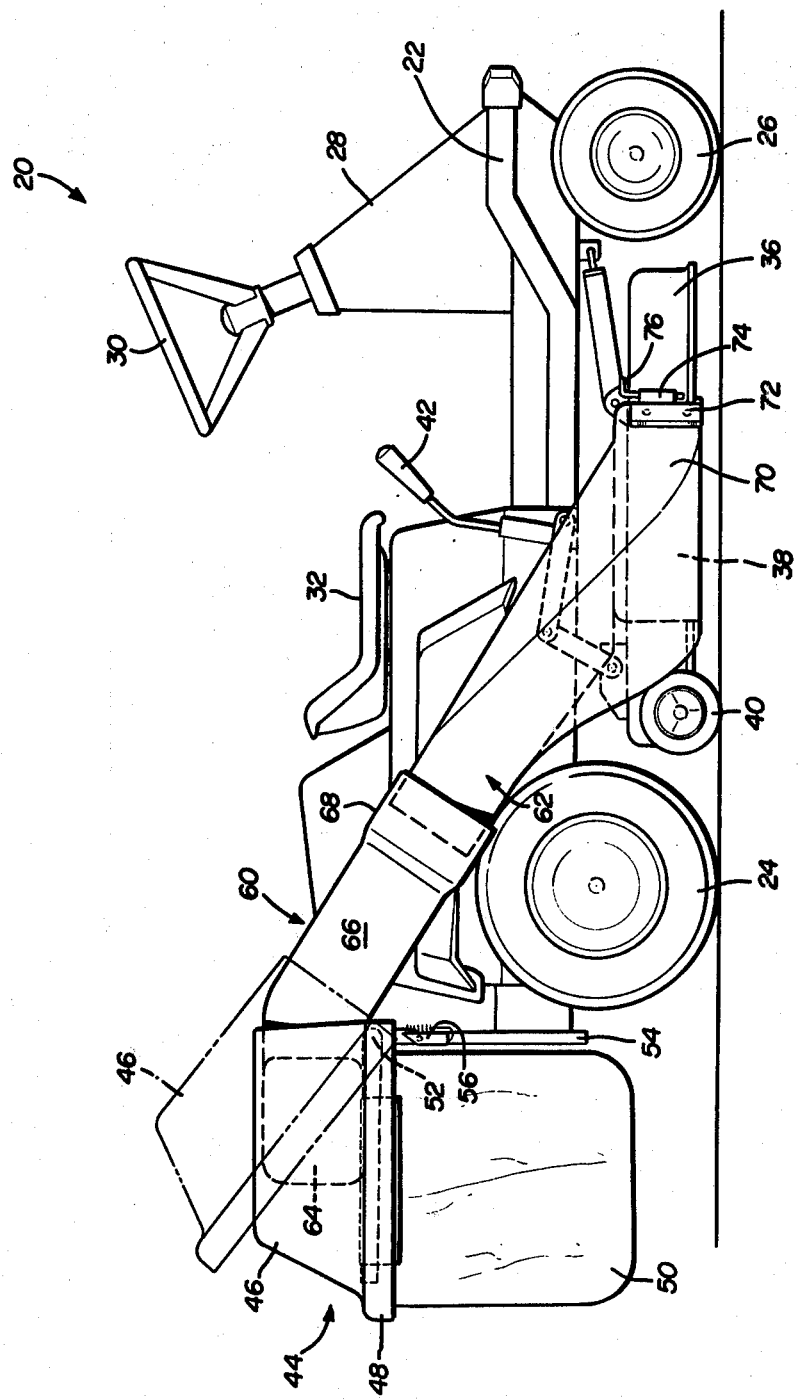
FIG. 1 is a side elevation of a rotary riding mower including one embodiment of the discharge chute assembly of the present invention.
Figure 2:
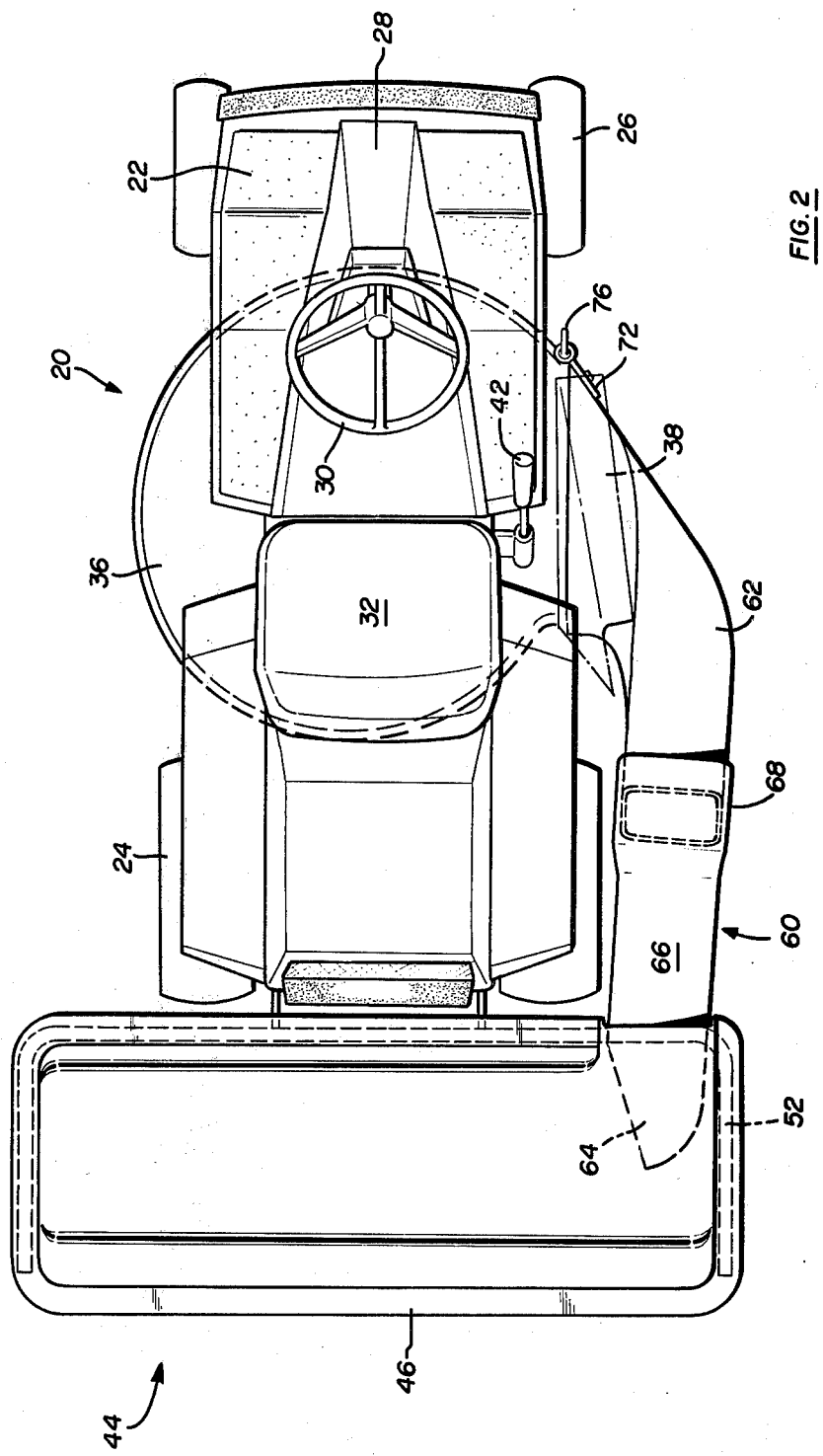
FIG. 2 is a top elevation of the riding mower and discharge chute assembly shown in FIG. 1.

As described above, the discharge chute assembly of this invention is particularly, although not exclusively adapted for rotary power mowers having a vertically adjustable blade housing, such as the riding mower 10 shown in FIGS. 1 and 2. Details of the riding mower including the design, the friction drive transmission, etc. have been disclosed in earlier filed applications for United States patent, see design application Ser. No. 751,515, filed Dec. 16, 1976 and Ser. No. 797,706, filed May 17, 1977.

The riding mower shown in FIGS. 1 and 2 includes a frame assembly 22 including fenders, etc., rear and forward ground traversing wheels, 26 and 28, respectively, a steering column 28 having a steering wheel 30 connected to the front wheels and an operator seat 32. In the disclosed embodiment, the rotary blade housing 36 has a discharge opening 38 which may include a cowl or extension and rear wheels 40 which prevent direct engagement of the rotary blade and the ground. The blade housing and the enclosed rotary blade are supported on the mower frame by a suitable linkage, now shown, which is adjusted by handle 42. In view of the fact that the riding mower 20 has already been disclosed in prior applications and will be understood by one skilled in the art from these disclosures, no further description is necessary.

The hopper assembly 44 may be generally conventional and includes a molded plastic cover 46 having a rim 48 and a bag 50 which receives the clippings, debris and other discharge from the rotary blade housing 36. In the preferred embodiment, the cover is hingedly supported on the tubular support 52 as best shown in FIG. 1. In the disclosed embodiment, the hopper is supported on an end plate 54 of the riding mower and an over-center spring clip maintains the cover 46 in a closed position. The details of the hopper assembly have not been disclosed herein because they do not form a part of the invention. For example, the bag 50 may be formed of an air permeable nylon and the cover may be molded from polyethylene or other suitable materials.

As described above, the discharge chute assembly of this invention includes two telescopically nested sections, including an upper discharge chute section 60 and a lower receiving chute section 62. The discharge chute section includes an upper end 64 which is received through an opening in the cover 46 and a downwardly angled portion 66 terminating in an enlarged bell portion 68. The lower receiving chute section 62 includes an enlarged rectangular inlet spout portion 70 which is releasably fastened to the rotary blade housing 36 in communication with the discharge port or opening 38. In the disclosed embodiment, a flap 72 is riveted or otherwise secured to the side edges of the spout portion having a hinge-like element which receives a hinge element of the rotary housing and a releasable latch pin 76 securely retains the receiving chute section in sealing relation. A similar releasable latch may be used on the opposed side of the spout portion, not shown. The receiving chute section then extends outwardly and upwardly in a generally spiral configuration of reducing rectangular cross section and the upper end is telescopically received in the enlarged bell opening 68 of the discharge chute section. As shown, the discharge chute is also of rectangular transverse cross section.

The receiving chute 62 thus defines a gradually decreasing spiral which directs the discharge from the rotary blade in the housing 36 in an upward spiral of increasing speed, substantially reducing clogging of the discharge system. If the system does become clogged, for example by sticks or other debris, the lower chute section 62 may be easily removed by removing latch pins 76 and pulling the lower section outwardly and downwardly. The discharge opening in the housing and the rotary blade are then easily accessible and foreign matter caught in the chutes may be easily removed without chance of accidental contact with the blade. Further, the upper discharge chute section 60 will not fall out although no fasteners are utilized. When the lower chute section 62 is removed, the upper section tilts forwardly about the tubular support 52 as described more fully hereinbelow.

Figure 3:
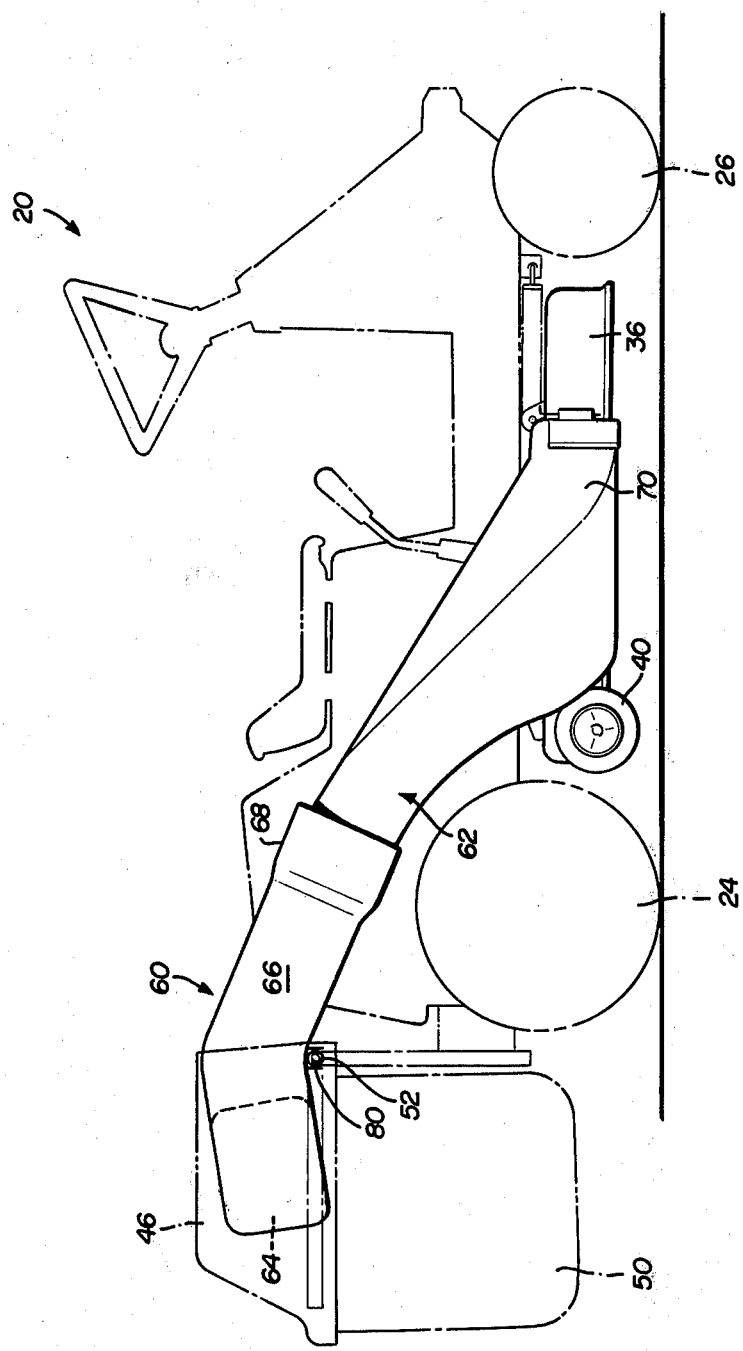
FIG. 3 is a side elevation of the discharge chute assembly shown in FIG. 1 illustrating the self-adjustment feature of the improved chute assembly.

The self-adjusting feature of the chute assembly is best shown in FIG. 3. In the disclosed embodiment, the upper discharge chute section 60 includes a downwardly opening channel or bracket 80 which is riveted or molded into the plastic chute. The channel 80 is received over the tubular support 52 of the hopper, pivotally supporting the upper receiving chute section 60 in the inlet opening of the hopper cover. When the lower section is removed, the free end 68 of the upper chute section pivots downwardly raising the upper end 64 into contact with the top of the cover, retaining the upper chute section in place, even when the cover is open as shown in phantom in FIG. 1.

When the rotary blade housing 36 is adjusted vertically to adjust the length of the cut of the mower by operation of lever or handle 42, the chute assembly of this invention is self-adjusting to matintain communication between the outlet 38 of the rotary blade housing and the hopper. When the housing 36 is raised as shown in FIG. 3, the lower receiving chute section 62 is raised in parallel relation, raising the upper end which is telescopically received in the bell opening 68. The upper chute section 66 will, however, tilt about the pivot axis of support tube 52, as necessary, to maintain communication between the chute sections.

It will be understood by those skilled in the art that the discharge chute assembly of this invention may be used in combination with various lawn and garden mowers, blowers and the like. Also, the elements of the discharge chute assembly may be formed of various materials, depending upon the particular application. For example, the chute sections are preferably formed of plastic for the reasons stated hereinabove. A particularly suitable plastic material is ultra high density polyethylene, which is easily formed into the desired shape, strong on impact, resistant to scratching from the internal flow of clippings, etc., and has a low coefficient of friction. It will also be understood that various modifications may be made to the discharge chute assembly without departing from the purview of the appended claims, which follow.

I claim:

1. A discharge collection system for a mower, particularly a rotary mower having a vertically adjustable mower blade housing and a discharge opening in said housing, comprising:

a hopper having an inlet opening for receiving the discharge of the mower and having a generally horizontal, transverse lip adjacent the opening, said lip being a tubular support of said hopper and said hopper having a cover pivotally supported on said tubular support, a tubular upper discharge chute having an upper end portion removably received within said hopper inlet opening said discharge chute includes a downwardly opening channel which is received over said hopper lip for pivotally supporting said upper end portion of said discharge chute within said hopper opening, and said discharge chute having a downwardly angled inlet portion terminating in an enlarged bell-shaped end portion, and a tubular lower receiving chute having a lower end opening portion secured to and communicating with the discharge opening of said mower and said receiving chute having an upwardly angled portion telescopically received within said enlarged bell-shaped end portion of said discharge chute, said blade housing may be raised and lowered thereby raising and lowering said receiving chute and pivotally tilting said discharge chute about said inlet opening lip while maintaining communication between said mower discharge opening and said hopper.

2. The mower discharge collection system defined in claim 1, characterized in that said hopper includes a downwardly opening generally box-shaped cover, said discharge chute being generally rectangular in transverse cross-section and said hopper inlet opening being rectangular, closely receiving said upper end portion of said discharge chute, said cover thereby supporting said discharge chute when the receiving chute is removed and said cover may be opened to remove accumulation from said mower while supporting said discharge chute.

3. The mower discharge collection system defined in claim 1, characterized in that said lower tubular receiving chute is generally rectangular in transverse cross section having an enlarged rectangular opening communicating with said mower discharge opening, said receiving chute then extending from said opening outwardly and upwardly in a generally spiral configuration of reducing cross section defining a spiral path for discharge from said rotary motor blade into said discharge chute.

4. The mower discharge collection system defined in claim 5, characterized in that said discharge chute is generally rectangular in cross-section having an enlarged rectangular opening loosely telescopically receiving said receiving chute and said upper end portion of said discharge chute being generally horizontal and opening at generally a right angle to said inlet portion of said discharge chute.

5. A discharge chute assembly for a rotary lawn mower having a lower rotary blade housing, a discharge opening in said housing, and a rearward discharge hopper, comprising:

a tubular receiving chute having an enlarged rectangular opening spout retained to said rotary blade housing and communicating with the discharge opening of said blade housing, said receiving chute being generally rectangular in transverse cross-section and extending outwardly and upwardly from said spout in a generally spiral configuration of reducing rectangular cross-section defining a spiral path for the discharge of said mower, and a tubular discharge chute having an upper end portion received within said hopper and a downwardly angled inlet portion having an enlarged rectangular opening receiving said receiving chute upper end, said hopper being enclosed and having an upper inlet opening and a transverse, tubular support lip adjacent said opening, and said discharge chute having a downwardly opening channel portion which is received over said hopper lip pivotally supporting said upper end portion of said discharge chute within said hopper opening, said receiving chute upper end is telescopically received within said discharge chute enlarged opening and said mower blade housing is adjustable vertically, wherein said receiving chute moves vertically with said mower blade housing during adjustment and said discharge chute tilts about said hopper lip to maintain communication between said mower housing discharge opening and said hopper through said chutes.

* * * * *